United States Patent [19]
Sturgess

[11] Patent Number: 5,441,293
[45] Date of Patent: Aug. 15, 1995

[54] DRAW-BAR COUPLINGS FOR VEHICLES

[75] Inventor: Peter G. Sturgess, Gwent, Wales

[73] Assignee: Lucas Industries, Solihull, West Midlands, England

[21] Appl. No.: 194,066

[22] Filed: Feb. 9, 1994

[30] Foreign Application Priority Data

Feb. 11, 1993 [GB] United Kingdom ............... 9302762

[51] Int. Cl.⁶ .................................................. B60T 7/12
[52] U.S. Cl. ................................. 280/432; 280/446.1
[58] Field of Search ............... 280/432, 423.1, 427, 280/446.1, 455.1, 483, 504

[56] References Cited

U.S. PATENT DOCUMENTS

| | | | |
|---|---|---|---|
| 4,319,766 | 3/1982 | Correg et al. | 280/432 X |
| 4,804,237 | 2/1989 | Gee et al. | 280/433 X |
| 5,060,965 | 10/1991 | Haefner et al. | 280/504 |
| 5,149,121 | 9/1992 | Hafner | 280/446.1 X |

FOREIGN PATENT DOCUMENTS

| | | |
|---|---|---|
| 0386939 | 9/1990 | European Pat. Off. |
| 2050977 | 1/1981 | United Kingdom . |
| 2208415 | 3/1989 | United Kingdom . |
| 8503479 | 8/1985 | WIPO . |

Primary Examiner—Brian L. Johnson
Assistant Examiner—Victor E. Johnson
Attorney, Agent, or Firm—Oldham, Oldham & Wilson Co.

[57] ABSTRACT

A draw-bar coupling for a vehicle combination incorporates a sensor assembly for sensing the loads acting on the coupling in more than one plane, specifically two or three planes at right angles to each other.

12 Claims, 6 Drawing Sheets

DRAW-BAR COUPLINGS FOR VEHICLES

This invention relates to improvements in draw-bar couplings for vehicle combinations of the kind in which a trailer is adapted to be towed by a towing vehicle.

In vehicles of the kind set forth it is desirable to maintain a given load in the draw-bar coupling during braking, to achieve total vehicle stability.

It is known from GB-A-2 208 415 for a force sensor to be coupled between a towing vehicle and a trailer to measure force exerted in the coupling between the tractor and the trailer. The measured force is applied to a servo mechanism which automatically adjusts the brakes of the trailer on the basic of the difference in the brake forces by increasing or decreasing the braking effect of the trailer.

The force sensor of GB-A-2 208 415 acts only in a single plane.

SUMMARY OF THE INVENTION

According to our invention in a draw-bar coupling for a vehicle combination comprising a trailer adapted to be towed through the coupling by means of a towing vehicle, the coupling incorporates sensing means for sensing the loads acting on the coupling in more than one plane.

Preferably the sensing means is adapted to sense the loads acting in two planes mutually at right angles to each other. For example, the sensing means maybe adapted to measure the loads imparted to the coupling by the trailer in substantially horizontal and vertical directions.

When the sensing means incorporates a housing, by measuring the strain created at the upper and lower ends of the housing, and using a sum and difference technique, the horizontal and vertical loads can be determined.

In another arrangement the sensing means is adapted to sense loads acting in three directions at right angles to each other.

In one construction an axial load applied to a loading pin extending through the housing is transferred onto the housing through resilient means to apply loads equally to four symmetrically arranged shear webs on the housing in order to give an indication of the load and direction.

A load in a direction normal to the axis of the loading pin is transferred through the housing and into the shear webs. In this case, however, the direction of shear in the two uppermost webs is opposite to that in the two lowermost webs.

Knowing the load in the upper and lower shear webs will allow horizontal and vertical loads to be determined.

The resilient means may comprise buffers of elastomeric material, suitably rubber, or Belleville washers.

Load cells, preferably of the strain gauges type, can then be used to determine the loads in the upper and lower shear webs, in turn to determine the loads in horizontal and vertical directions.

Using strain gauges to measure loads means that high strains are required in the housing. To prevent the housing from failing about the shear webs during an unusual and unexpected impact, for example should the trailer be reversed into an obstruction, overload stops are provided to earth out the load to the chassis of the vehicle. If the load increases above normal service loads the entire deflection in the resilient means allows an abutment to contact the overload stops to prevent any further increase in load in the shear webs.

In one construction an annular abutment plate extending radially from the loading pin is movable with the pin through a limited distance in opposed axial directions determined by predetermined clearances between opposite faces of the plate and shoulders at opposite ends of arcuate grooves in the wall of the housing and into which an abutment plate extends radially.

Some embodiments of our invention are illustrated in the accompanying drawings in which:

DESCRIPTION OF PREFERRED EMBODIMENTS

Figure 1:
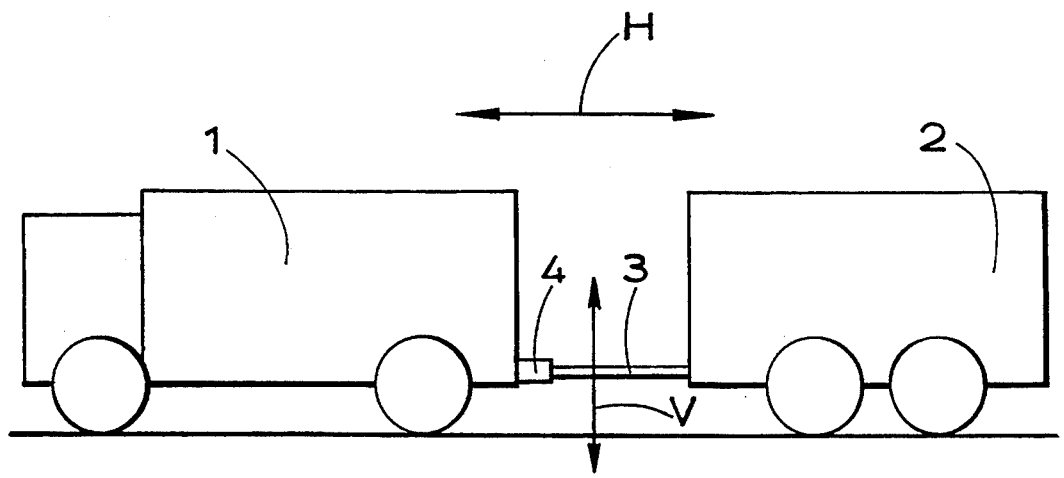
FIG. 1 is a side view of a vehicle combination comprising a trailer towed by a tractor.
Figure 2:
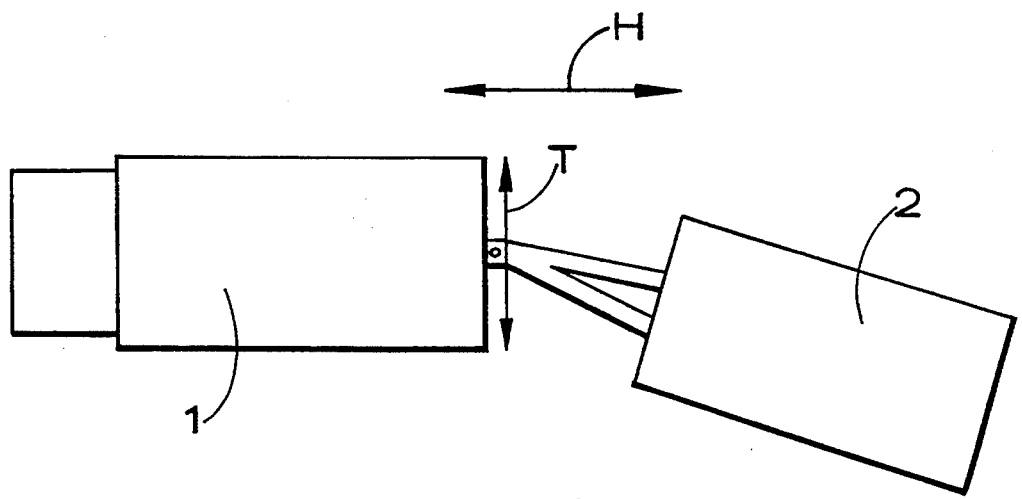
FIG. 2 is a plan of the vehicle.

The vehicle combination illustrated in FIGS. 1 and 2 of the drawings comprises a towing vehicle in the form of a tractor 1 coupled to a trailer 2 through a draw-bar coupling 3. The draw-bar coupling 3 includes sensing means for sensing the loads acting on the coupling in more than one plane comprising a sensor assembly 4. The sensor assembly 4 is adapted to sense loads imparted to the coupling 3 by the trailer 2 in three directions at right angles to each other as shown, namely a generally horizontal direction H coinciding with the longitudinal axis of the sensor assembly 4, a generally vertical direction V normal to the longitudinal axis of the sensor assembly 4, and a transverse direction T normal to the two vectors H and V.

Figure 3:
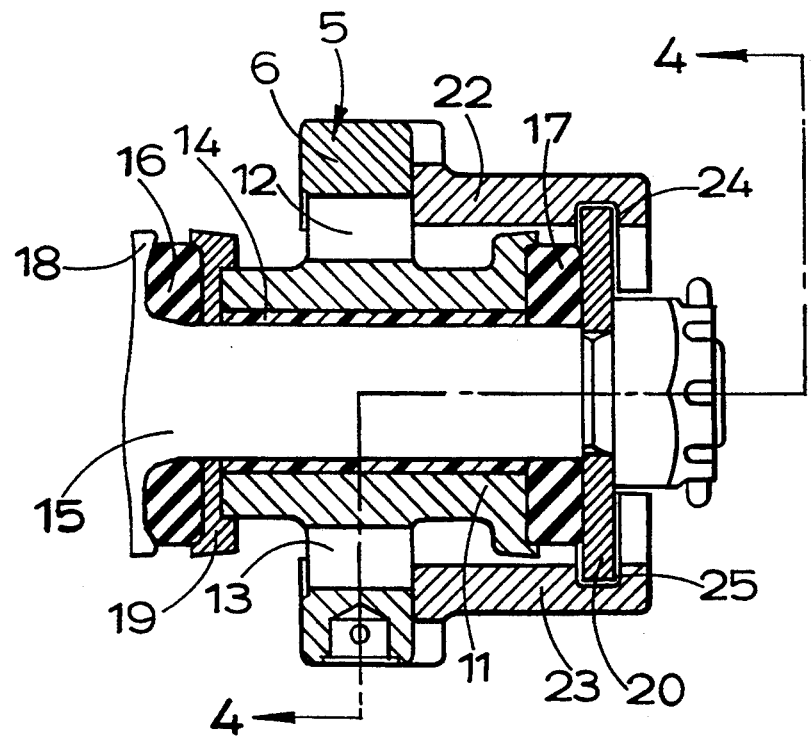
FIG. 3 is a longitudinal section through a sensor assembly incorporated in the draw-bar coupling of the vehicle on the line 3—3 of FIG. 4, the section taken generally in a horizontal plane.
Figure 4:
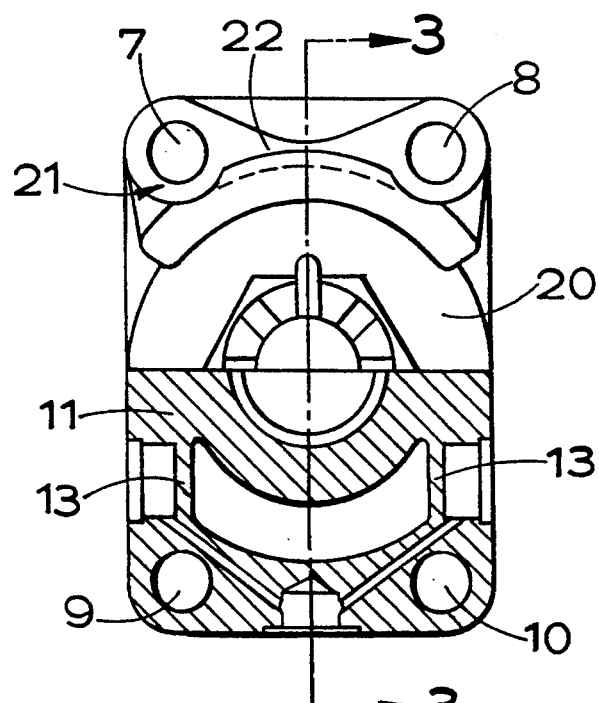
FIG. 4 is a section on the line 4—4 of FIG. 3.

As illustrated in FIGS. 3 and 4 of the drawings the sensor assembly 4 comprises a housing 5 which is rigidly secured to the chassis of the tractor 1, substantially in a horizontal plane. The housing 5 comprises a mounting plate 6 which is adapted to be secured to the tractor 1 by suitable fastening means cooperating with pairs of openings 7 and 8 and openings 9 and 10, to the left and right sides, respectively. A central core 11 extends from opposite sides of the mounting plate 6 from which it is carried by a pair of shear webs 12 and a pair of shear webs 13 which are spaced laterally from each other. The webs 12 and 13 are, each of relatively narrow section. The core 11 is bushed by an axially extending cylindrical spacer 14, suitably of nylon. The shear webs 12 and 13 are substantially symmetrically arranged, with the webs in each pairs being parallel to each other, and webs in one pair being aligned with corresponding webs in the other pair.

The load from the tractor 1 is transferred to the trailer 2 through a loading pin 15. The pin 15 extends axially through the bore of the spacer 14 in which it is a working fit, and shoulders on the pin 15 act on opposite ends of the core 11 through buffers 16 and 17 of elastomeric material, suitably rubber, and, each of annular outline. The buffer 16 is clamped between an enlarged head 18 on the pin 15 and an oppositely recessed thrust member 19 of which the inner recess receives the adjacent end of the core 11, and the rubber buffer 17 is clamped between the opposite end of the core 11 and an annular abutment plate 20 which extends radially beyond the outer edge of the core 11.

In a modification the buffers 16 and 17 may be replaced by other resilient means, suitably Belleville washers. In another construction the buffers 16 and 17 may be omitted completely so that the load from the loading pin 15 is transferred directly to the housing 5.

An overload stop 21 clamped against the plate 6 by the fastening means which pass through the openings 7–10 comprises left and right axially extending thrust transmitting members 22 and 23 which are relatively spaced laterally, each of part-circular outline. Each member 22, 23 is provided with an internal recess 24, 25. The recesses 24 and 25 receive diametrically opposed portions of the abutment plate 6 with clearances being provided between opposite faces of the abutment plate 6 and opposite ends of the recesses.

The sensor assembly 4 is arranged to maintain a given load in the draw-bar coupling 3 for total vehicle stability.

In operation any load in the horizontal plane H applied to the loading pin 15 is transferred through the rubber buffers 16 and 17 onto the core 11 which, in turn, loads equally the four webs 12 and 13.

A vertical load in direction V applied to the loading pin 15 is transferred through the spacer 14 and into the shear webs 12 and 13 through the core 6. In this case, however, the direction of shear in the two webs 12 is opposite to that in the two webs 13.

Similarly, a load applied to the loading pin 15 in the direction of the direction T will again be transferred through the spacer 14 into the shear webs 12 and 13. In such a case the direction of shear in the pair of webs on one lateral side will be opposite that in the remaining webs. Specifically, the shear in the pair of webs on said lateral side will be positive, and that in the said remaining webs, negative.

Load cells of any suitable construction can be utilised to measure the loads in the shear webs 12 and 13 and, in consequence, to utilise the information received in order to regulate differentially the application of the brakes on the wheels on the trailer in order to maintain total vehicle stability.

When the load cells comprise strain gauges, the strain gauges can be arranged in many convenient configurations. Different configurations are illustrated in FIGS. 5 and 6, 7 and 8, and 9 and 10 of the accompanying drawings.

Using strain gauges to measure load means that high strain are required in the shear webs 12 and 13. The overload stop 21 is therefore provided to prevent the webs 12 and 13 from failing as a result of an unusual impact such as might occur if the trailer 2 is reversed into an obstruction, such as a wall. Should this occur, the increased load in the loading pin 15 is transferred from the abutment plate 20 to both left and right members 22 and 23 thereby preventing any further increase in load in the shear webs 12 and 13.

Figure 5:
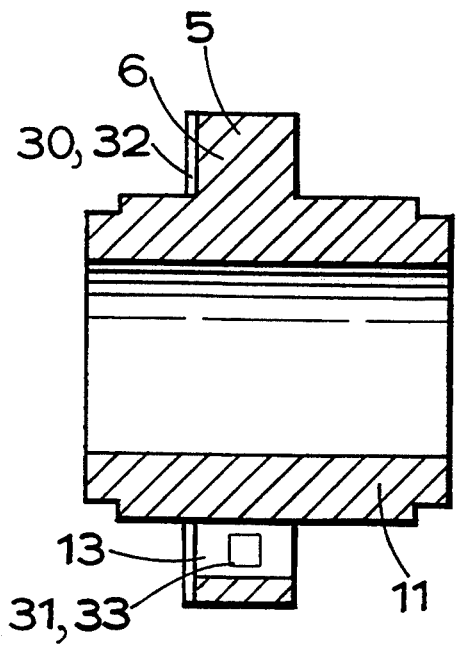
FIG. 5 is a longitudinal section through the housing of the sensor assembly and taken on line 5—5 of FIG. 6.
Figure 6:
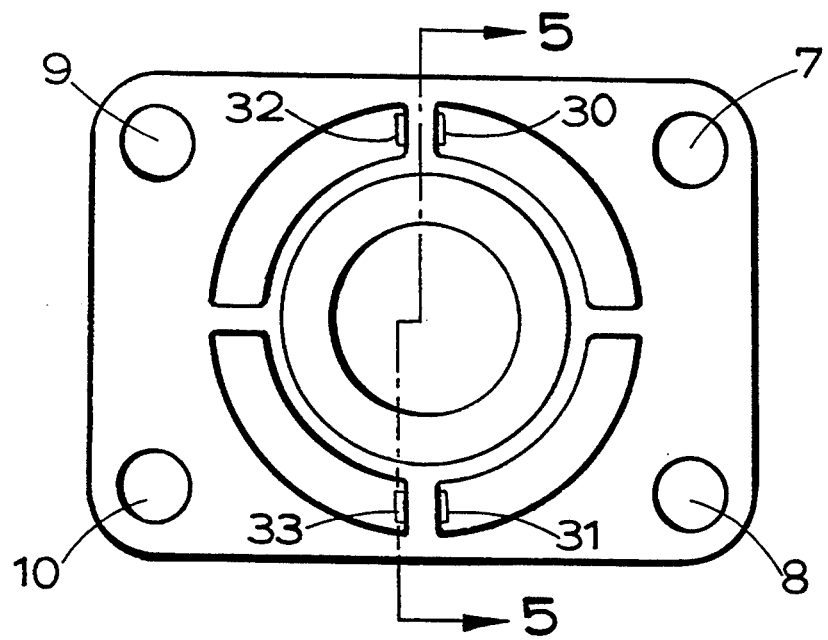
FIG. 6 is a end view of the housing.

As illustrated in FIGS. 5 and 6 a strain gauge 30, 32 is provided for each of the two upper shear webs 12 and a strain gauge 32, 33 is provided for each of the lower shear webs 13. Each strain gauge is located at an end of an arcuate opening in the housing 5.

The strain gauges 30, 31, 32, 33 comprise spaced segments secured to the face of the mounting plate 6 remote from the overload stop 22.

Figure 7:
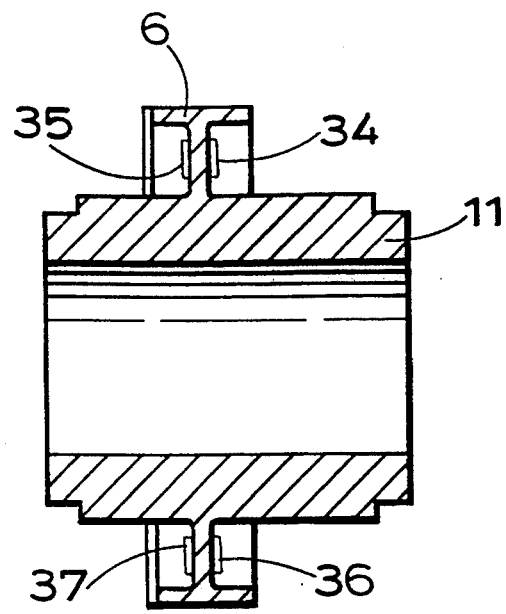
FIG. 7 is a longitudinal section through a modified housing provided with strain gauges.
Figure 8:
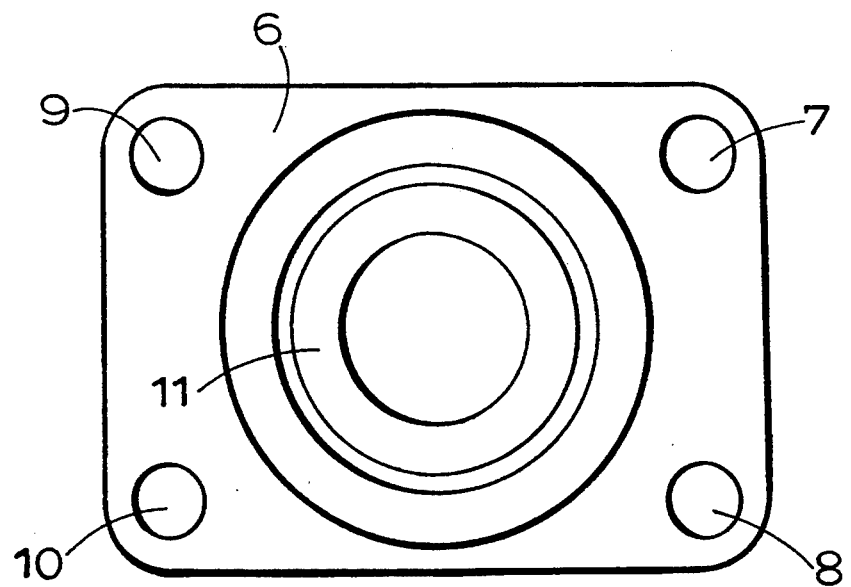
FIG. 8 is an end view of a housing of FIG. 7.
Figure 9:
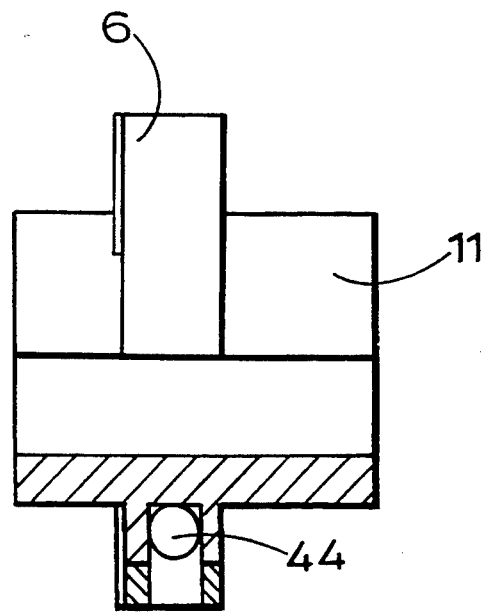
FIG. 9 is a longitudinal section through another housing on the line 9—9 of FIG. 10.
Figure 10:
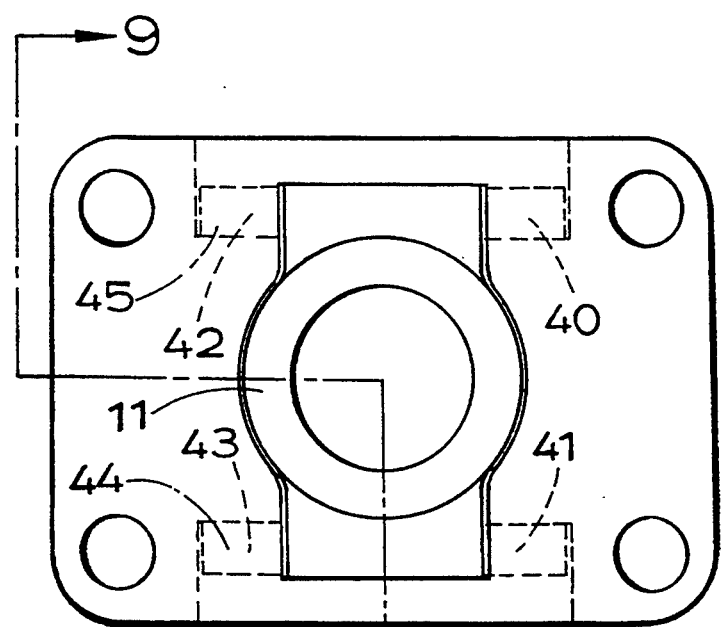
FIG. 10 is an end view of the housing of FIG. 9.
Figure 11:
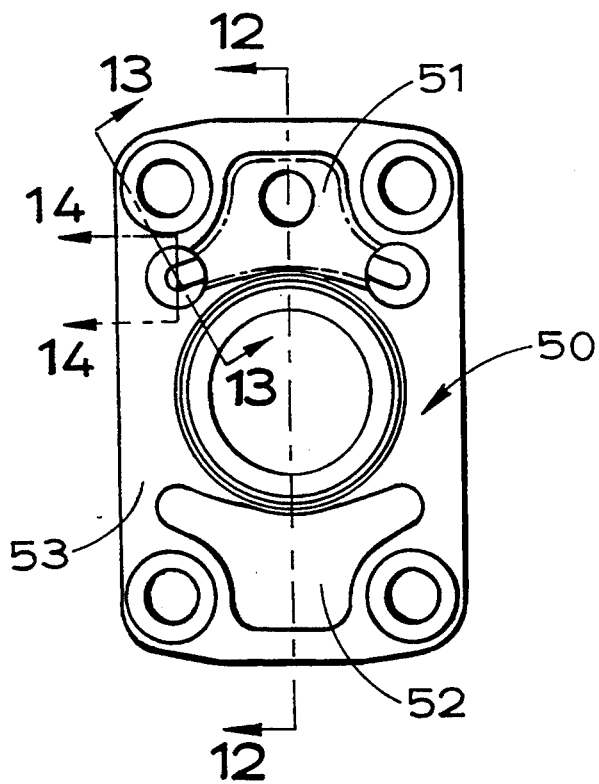
FIG. 11 is an end view of another housing provided with strain gauges.
Figure 12:
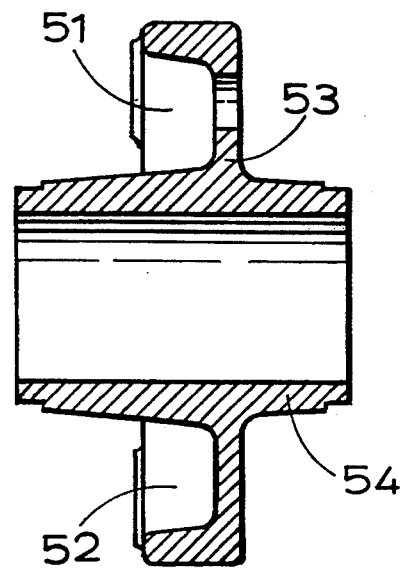
FIG. 12 is a section on the line 12—12 of FIG. 11.
Figure 13:
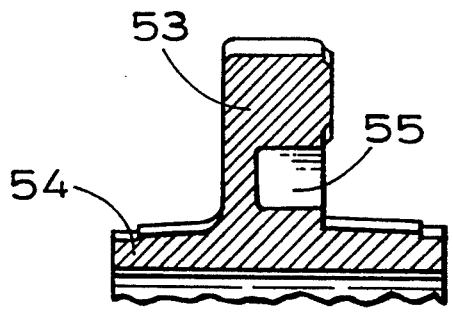
FIG. 13 is a section on the line 13—13 of FIG. 11.
Figure 14:
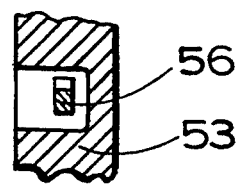
FIG. 14 is a section on the line 14—14 of FIG. 11.

In the embodiment of FIGS. 7 and 8 the mounting plate 6 is reduced in thickness by the provision of annular recesses in opposite faces, and strain gauges 34, 35, 36, 37 are mounted on the walls defined by the bases of the recesses In the embodiment of FIGS. 9 and 10 the strain gauges 40, 41, and 42, 43 are located in parallel pins 44 and 45 housed in open ended slots in the mounting plate 6.

In the one-piece housing 50 illustrated in FIGS. 11–14 of the accompanying drawings recesses 51 and 52 are symmetrically arranged in a mounting plate 53 in a generally horizontal plate on opposite sides of the main longitudinal axis passing through a central core 54. Opposite ends of each recess 51 and 52 lead into a respective blind bore 55 in which a load cell is mounted, only one of the four load cells being illustrated at 56.

In this construction the shear webs comprise portions of the mounting plate 53 defining opposite ends of the recesses 51 and 52.

What is claimed is:

1. A draw-bar coupling for a vehicle combination of the type comprising a towing vehicle, a trailer adapted to be towed by said towing vehicle, and a coupling through which said trailer is towed by said towing vehicle, wherein said coupling comprises:
   sensing means for sensing loads acting on said coupling in more than one direction;
   a housing including a mounting plate adapted to be secured to said towing vehicle, a central core, and at least two symmetrically arranged discrete webs integral with said mounting plate and said central core and supporting said core with respect to said mounting plate, said webs being of a thickness substantially less than that of said mounting plate; and
   a loading pin adapted to be coupled to said trailer and coupled with said central core to transmit loads to said webs through said central core;
   wherein said sensing means measures strains in said webs to determine said loads acting on said coupling.

2. A draw-bar coupling as claimed in claim 1 wherein said sensing means incorporates means adapted to sense loads acting in two planes mutually at right angles to each other.

3. A draw-bar coupling as claimed in claim 1 wherein said sensing means incorporates means adapted to measure loads imparted to said coupling by said trailer in substantially horizontal and vertical directions.

4. A draw-bar coupling as claimed in claim 3, wherein said housing has upper and lower ends, and horizontal and vertical loads are determined by means for measuring strain created at said upper and lower ends of the housing.

5. A draw-bar coupling as claimed in claim 1, wherein said sensing means is adapted to sense loads acting in three directions at right angles to each other.

6. A draw-bar coupling as claimed in claim 1, wherein said loading pin extends through said housing, and complementary abutments are provided on said loading pin and said housing, an axial load applied to said loading pin being transferred to said webs through said complementary abutments.

7. A draw-bar coupling as claimed in claim 1, including resilient means, wherein said loading pin acts on said central core through said resilient means.

8. A draw-bar coupling as claimed in claim 7, wherein said resilient means comprises buffers of elastomeric material.

9. A draw-bar coupling as claimed in claim 1, wherein four symmetrically arranged webs are provided in said housing.

10. A draw-bar coupling as claimed in claim 1, wherein load cells are adapted to be used to determine the loads in said shear webs, in turn to determine the loads in horizontal and vertical directions.

11. A draw-bar coupling as claimed in claim 1, wherein overload stops are provided in said housing to absorb impact loads to a chassis of said vehicle.

12. A draw-bar coupling as claimed in claim 11, wherein said overload stops comprise an annular abutment plate extending radially from said loading pin and movable with said pin through a limited distance in opposed axial directions determined by predetermined clearances between opposite faces of said plate and shoulders at opposite ends of arcuate grooves in said mounting plate and into which said abutment plate extends radially.

* * * * *